United States Patent
Krishnamoorthy et al.

(10) Patent No.: US 10,555,246 B2
(45) Date of Patent: Feb. 4, 2020

(54) SHARING NETWORK FEEDBACK INFORMATION USING A DEVICE-TO-DEVICE LINK

(71) Applicant: QUALCOMM Incorporated, San Diego, CA (US)

(72) Inventors: Parthasarathy Krishnamoorthy, San Diego, CA (US); Prashanth Mohan, Hyderabad (IN); KrishnaKumar Vasanthasenan, Hyderabad (IN); Ammar Kitabi, San Diego, CA (US); Pavan Kaivaram, San Diego, CA (US); Praveen Kumar Appani, San Diego, CA (US); Jayesh Bathija, San Diego, CA (US); Eduardo Esteves, San Diego, CA (US); Vikas Gupta, San Diego, CA (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 14/991,343

(22) Filed: Jan. 8, 2016

(65) Prior Publication Data

US 2017/0201933 A1     Jul. 13, 2017

(51) Int. Cl.
*H04W 48/16* (2009.01)
*H04W 76/23* (2018.01)
(Continued)

(52) U.S. Cl.
CPC ............ *H04W 48/16* (2013.01); *H04W 4/14* (2013.01); *H04W 24/08* (2013.01); *H04W 48/12* (2013.01); *H04W 48/14* (2013.01); *H04W 48/18* (2013.01); *H04W 76/14* (2018.02); *H04W 76/23* (2018.02); *H04W 84/042* (2013.01); *H04W 88/06* (2013.01)

(58) Field of Classification Search
CPC ..... H04W 48/12; H04W 48/16; H04W 48/18; H04W 4/14; H04W 24/08; H04W 76/023; H04W 84/042; H04W 88/06
See application file for complete search history.

(56) References Cited

U.S. PATENT DOCUMENTS 8,655,348 B2   2/2014   Zha et al.
8,761,099 B2   6/2014   Charbit et al.
(Continued)

FOREIGN PATENT DOCUMENTS

WO   2013152671 A1   10/2013
WO   2016000795 A1   1/2016

OTHER PUBLICATIONS

International Search Report and Written Opinion—PCT/US2016/065548—ISA/EPO—dated Feb. 16, 2017.

*Primary Examiner* — Jenee Holland
(74) *Attorney, Agent, or Firm* — Muncy, Geissler, Olds & Lowe, P.C.

(57) ABSTRACT

Systems and methods are disclosed for sharing network feedback information. The method may include establishing, at a first access terminal, a wireless link with an access point, receiving network configuration data from the access point, composing a network feedback expression that indicates a status or availability of at least one network service associated with the access point, and transmitting the network feedback expression to a second access terminal via a D2D link.

33 Claims, 6 Drawing Sheets

(51) Int. Cl.
*H04W 48/14* (2009.01)
*H04W 48/18* (2009.01)
*H04W 48/12* (2009.01)
*H04W 24/08* (2009.01)
*H04W 4/14* (2009.01)
*H04W 76/14* (2018.01)
*H04W 88/06* (2009.01)
*H04W 84/04* (2009.01)

(56) References Cited

U.S. PATENT DOCUMENTS

| | | | |
|---|---|---|---|
| 9,083,355 B2 | 7/2015 | Laroia et al. | |
| 2002/0116336 A1* | 8/2002 | Diacakis | G06Q 10/087 705/51 |
| 2003/0157896 A1* | 8/2003 | Mee | H04L 43/16 455/67.11 |
| 2005/0090278 A1* | 4/2005 | Jeong | H04W 36/0055 455/525 |
| 2007/0067398 A1* | 3/2007 | Karmarkar | H04L 51/38 709/206 |
| 2010/0255807 A1* | 10/2010 | Umatt | H04W 4/22 455/404.1 |
| 2010/0265847 A1* | 10/2010 | Lee | H04W 48/02 370/254 |
| 2010/0330921 A1* | 12/2010 | Kim | H04W 24/10 455/67.11 |
| 2011/0183661 A1* | 7/2011 | Yi | H04W 24/10 455/422.1 |
| 2011/0217973 A1* | 9/2011 | Sagfors | H04L 69/32 455/423 |
| 2011/0275375 A1* | 11/2011 | Yamagishi | H04W 36/0055 455/436 |
| 2012/0250578 A1* | 10/2012 | Pani | H04W 48/12 370/254 |
| 2012/0300739 A1* | 11/2012 | Froberg Olsson | H04L 1/0006 370/329 |
| 2012/0315913 A1 | 12/2012 | Yang et al. | |
| 2013/0115955 A1 | 5/2013 | Deng et al. | |
| 2013/0176862 A1* | 7/2013 | Gwak | H04L 1/20 370/242 |
| 2013/0259011 A1* | 10/2013 | Nakashima | H04W 72/0473 370/336 |
| 2013/0279457 A1 | 10/2013 | Takano | |
| 2015/0016419 A1* | 1/2015 | Kim | H04W 36/04 370/331 |
| 2015/0087297 A1 | 3/2015 | Hakola et al. | |
| 2015/0139015 A1* | 5/2015 | Kadous | H04W 24/08 370/252 |
| 2016/0007271 A1* | 1/2016 | Plicanic Samuelsson | H04W 48/14 455/426.1 |

\* cited by examiner

SHARING NETWORK FEEDBACK INFORMATION USING A DEVICE-TO-DEVICE LINK

BACKGROUND OF THE INVENTION

Aspects of this disclosure relate to wireless communication systems. In particular, aspects of this disclosure relate to composing, sharing, and/or utilizing network feedback information.

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems.

Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile Access (GSM) variation of TDMA, and newer hybrid digital communication systems using both TDMA and CDMA technologies. More recently, Long Term Evolution (LTE) has been developed as a wireless communication protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

In recent years, use of device-to-device (D2D) communications has increased. Examples of D2D communications (also known as peer-to-peer (P2P) communications)) include Bluetooth Low Energy (BTLE), WiFi-Direct, WiFi Aware, and LTE-Direct (LTE-D). D2D communication protocols enable access terminals to discover one another and establish a D2D network. Utilization of D2D networks enables the access terminals to continuously and passively share information while using less power and requiring less network presence. However, new ways of reducing power consumption and improving network performance are still in demand.

SUMMARY

The following summary is an overview provided solely to aid in the description of various aspects of the disclosure and is provided solely for illustration of the aspects and not limitation thereof.

In one example, a method of sharing network feedback information is disclosed. The method of sharing network feedback information may include, for example, establishing, at a first access terminal, a wireless link with an access point, receiving network configuration data from the access point, composing a network feedback expression that indicates a status or availability of at least one network service associated with the access point, and transmitting the network feedback expression to a second access terminal via a D2D link.

In another example, a method of locating network services is disclosed. The method of locating network services may include, for example, identifying one or more desired network services, establishing, at a first access terminal, a D2D link with a second access terminal, receiving a network feedback expression from the second access terminal via the D2D link, wherein the network feedback expression indicates a status or availability of network services associated with an access point, and determining based on the network feedback expression whether the access point provides the one or more desired network services.

In yet another example, an apparatus for sharing network feedback information is disclosed. The apparatus for sharing network feedback information may include, for example, at least one transceiver configured to establish, at a first access terminal, a wireless link with an access point, receive network configuration data from the access point, and transmit a network feedback expression to a second access terminal via a D2D link, at least one processor, and at least one memory coupled to the at least one processor, the at least one processor and the at least one memory being configured to compose the network feedback expression, wherein the network feedback expression indicates a status or availability of at least one network service associated with the access point.

In yet another example, an apparatus for locating network services is disclosed. The apparatus for locating network services may include, for example, at least one transceiver configured to establish, at a first access terminal, a D2D link with a second access terminal, and receive a network feedback expression from the second access terminal via the D2D link, wherein the network feedback expression indicates a status or availability of network services associated with an access point, at least one processor, and at least one memory coupled to the at least one processor, the at least one processor and the at least one memory being configured to identify one or more desired network services, and determine based on the network feedback expression whether the access point provides the one or more desired network services.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
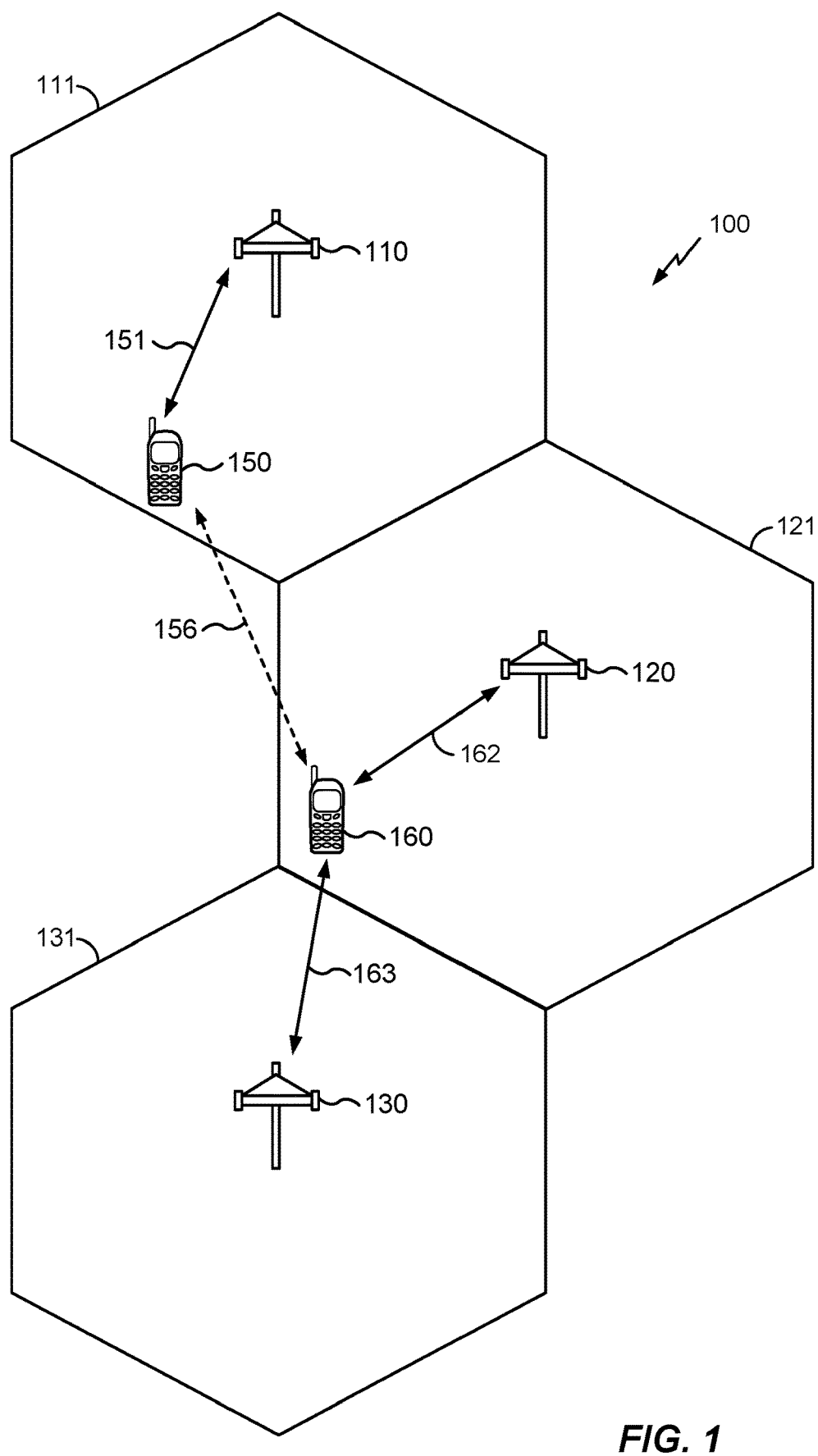
FIG. 1 generally illustrates a wireless environment in which access terminals compose, share, and/or utilize network feedback information in accordance with an aspect of the disclosure.

Aspects of the invention disclosed in the following description and related drawings are directed to specific embodiments of the invention. Alternate embodiments may be devised without departing from the scope of the invention. Additionally, well-known elements of the invention will not be described in detail, or will be omitted, so as not to obscure the relevant details of the invention. The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage, or mode of operation. Further, many embodiments are described in terms of sequences of actions to be performed by, for example, elements of a computing device. It will be recognized that various actions described herein can be performed by specific circuits (for example, application specific integrated circuits (ASICs)), by program instructions being executed by one or more processors, or by a combination of both. Additionally, the sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

An access terminal may be mobile or stationary, and may communicate with a radio access network (RAN). As used herein, the term "access terminal" may be referred to interchangeably as an "access terminal" or "AT", a "wireless device", a "subscriber device", a "subscriber terminal", a "subscriber station", a "user terminal" or "UT", a "user equipment" or "UE", a "mobile terminal", a "mobile station", or variations thereof. Generally, access terminals can communicate with a core network via the RAN, and through the core network the access terminals can be connected with external networks such as the Internet. Of course, other mechanisms of connecting to the core network and/or the Internet are also possible for the access terminals, such as over wired access networks, WiFi networks (for example, based on IEEE 802.11, etc.) and so on. Access terminals can be embodied by any of a number of types of devices including but not limited to PC cards, compact flash devices, external or internal modems, wireless or wireline phones, and so on.

The access terminal may communicate with the RAN via an access point. As used herein, the term "access point" may be referred to interchangeably as an "access point" or "AP", a "base station" or "BS", an "access point base station", a "Node B", an "eNode B", a "home base station", a "home Node B", a "femto cell" or "pico cell", or variations thereof. Generally, access points can relay data from the core network and the RAN to access terminals and vice-versa.

FIG. 1 generally illustrates a wireless environment 100 that includes a first access point 110, a second access point 120, and a third access point 130. The access point 110 is associated with a coverage area 111, the access point 120 is associated with a coverage area 121, and the access point 130 is associated with a coverage area 131. A coverage area may sometimes be referred to as a "cell". Although the respective access points 110, 120, 130 are depicted as base stations, it will be understood that this is solely for the purposes of illustration, and that the respective access points 110, 120, 130 may be a macro-cell base station or a small-cell base station (or any combination thereof), may use any suitable radio access technology or technologies (RATs), and may have any suitable access restrictions. Although the respective coverage areas 111, 121, 131 are depicted as non-overlapping hexagonal areas of equal size, it will be understood that this is solely for the purposes of illustration, and that the respective access points 110, 120, 130 may have any size or shape, may be stationary or mobile, and may be partially or wholly overlapping.

Also depicted in FIG. 1 is an access terminal 150 and an access terminal 160. Although the respective access terminals 150, 160 are depicted as cellular telephones, it will be understood that this is solely for the purposes of illustration, and that the respective access terminals 150, 160 may be wireless devices of any kind using any suitable RAT or RATs.

Generally, the respective access points 110, 120, 130 provide network access to access terminals within their respective coverage areas 111, 121, 131. As is depicted in FIG. 1, the access terminal 150 may be within the coverage area 111 of the access point 110 and may establish (or may have previously established) a wireless link 151 with the access point 110. The wireless link 151 may be used by the access terminal 150 and the access point 110 to wirelessly exchange data. Similarly, the access terminal 160 may be in or near the coverage areas 121, 131 of the respective access points 120, 130. Accordingly, the access terminal 160 may establish (or may have previously established) a wireless link 162 with the access point 120 and/or a wireless link 163 with the access point 130.

The access terminal 150 (which, as depicted in FIG. 1, has already established the wireless link 151 with access point 110) may wish to establish a new wireless link with a different access point, for example, the access point 120 or the access point 130. In some implementations, the access terminal 150 may be mobile and may determine that a handover should be performed as it passes further away from the access point 110 and closer to the access point 120 or the access point 130. In some implementations, the access terminal 150 may determine that the wireless link 151 is insufficient and that a supplemental wireless link is necessary. In some implementations, the access terminal 150 may determine that the access point 110 does not provide desired network services. Although the reasons may vary, it will be understood that under certain circumstances, the access terminal 150 may wish to establish a new wireless link with a different access point.

As noted above, the access terminal 150 may desire specific network services or require a specific level of network performance. For example, the access terminal 150 may require an access point with a certain radio link failure (RLF) status or may require that a specific service functionality such as voice, data, or short message service (SMS), is supported. Conventionally, the access terminal 150 may camp on a new access point, for example, the access point 120, and obtain network configuration data therefrom. Based on the network configuration data obtained from the access point 120, the access terminal 150 may then determine whether the access point 120 can provide the network services desired by the access terminal 150 and/or meet the desired network performance of the access terminal 150. If the access terminal 150 determines that the access point 120 can not meet its service or performance needs, then the access terminal 150 may detach from the access point 120 and repeat the process with another new access point, for example, the access point 130. Although the access terminal 150 may eventually find a satisfactory access point through trial and error, the process may result in unnecessary power and resource consumption.

In accordance with an aspect of the disclosure, the access terminal 150 may determine whether a different access point can meet its service or performance needs without camping on it and obtaining network configuration data directly therefrom. Instead, the access terminal 150 may obtain the data from another access terminal, for example the access terminal 160, using a D2D link 156.

Access terminals such as the access terminal 150 and the access terminal 160 may form or join a D2D group including any number of access terminals. Members of the D2D group may broadcast signals such that they are received by each wireless device in the D2D group, transmit signals directly to a specific wireless device in the D2D group, relay signals from one wireless device in the D2D group to another wireless device in the D2D group, etc. The formation or joining of the D2D group may be performed using any suitable protocol, but generally begins with discovery of other D2D-capable devices. For example, discovery can be performed in accordance with the technical specifications set forth by the Third-Generation Partnership Project (for example, 3GPP TS 23.303, "Proximity-based services (ProSe); Stage 2")), the WiFi Alliance (for example, WiFi Peer-to-Peer Services (P2Ps) Technical Specification)), or any other suitable standard-setter. The above-noted discovery techniques may be known by other names. Moreover, other variations and/or alternatives are known. A non-exclusive list of suitable discovery protocols includes LTE-Direct discovery protocol, WiFi-Direct discovery protocol, AllJoyn discovery protocol, WiFi Aware discovery protocol, Bluetooth discovery protocol, and Bluetooth Low Energy discovery protocol.

Once discovery has been performed by, for example, the access terminal 150 and the access terminal 160, the D2D link 156 may be established therebetween. Different D2D protocols have different ranges. However, it will be understood that, in some scenarios, the D2D link 156 may be established independently of the coverage areas 111, 121, 131. As depicted in FIG. 1, it is not necessary for the access terminal 150 and the access terminal 160 to share a coverage area in order to establish the D2D link 156. Moreover, the RAT used to establish the D2D link 156 may be the same or different from the RAT used to establish the wireless link 151, the wireless link 162, and/or the wireless link 163.

Figure 2:
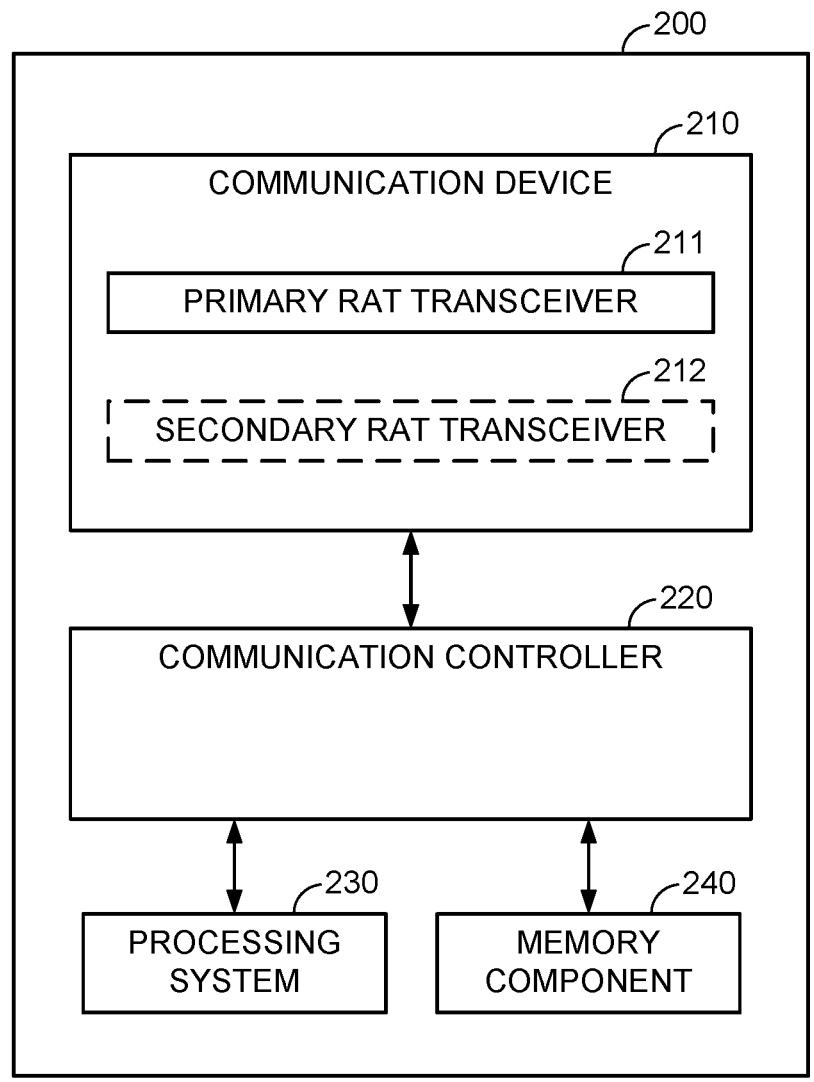
FIG. 2 generally illustrates examples of an access terminal in accordance with aspects of the disclosure.

FIG. 2 generally illustrates an access terminal 200 configured to compose, share, and/or utilize network feedback information using a D2D link in accordance with an aspect of the disclosure. In general, the access terminal 200 may be any wireless communication device allowing a user to communicate over a communications network (for example, a mobile phone, router, personal computer, server, entertainment device, Internet of Things (IOT)/Internet of Everything (IOE) capable device, in-vehicle communication device, etc.)). The access terminal 200 may operate according to one or several radio access technologies (RATs).

The access terminal 200 generally includes a communication device 210 for communicating with other network nodes via at least one designated RAT. The communication device 210 may be variously configured for transmitting and encoding signals (for example, messages, indications, information, etc.), and, conversely, for receiving and decoding signals (for example, messages, indications, information, pilots, etc.) in accordance with the designated RAT. The access terminal 200 may also generally include a communication controller 220 for controlling operation of the communication device 210 (for example, directing, modifying, enabling, disabling, etc.). The communication controller 220 may operate independently from the host system functionality, illustrated as a processing system 230 and a memory component 240. Additionally or alternatively, the communication controller 220 may operate at the direction of, or otherwise in conjunction with, respective host system functionality. In some designs, the communication controller 220 may be partly or wholly subsumed by the respective host system functionality.

In the example of FIG. 2, the communication device 210 includes two co-located transceivers operating according to respective RATs, including a primary-RAT transceiver 211 and an optional secondary-RAT transceiver 212. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (for example, a WiFi chip or similar circuitry simply providing low-level sniffing). Further, as used herein, the term "co-located" (for example, radios, access points, transceivers, etc.) may refer to one of various arrangements. For example, components that are in the same housing; components that are hosted by the same processor; components that are within a defined distance of one another; and/or components that are connected via an interface (for example, an Ethernet switch) where the interface meets the latency requirements of any required inter-component communication (for example, messaging).

The primary-RAT transceiver 211 and the secondary-RAT transceiver 212 may provide different functionalities and may be used for different purposes. As an example, the primary-RAT transceiver 211 may operate in accordance with Long-Term Evolution (LTE) technology to provide communication with other nodes, while the secondary-RAT transceiver 212 may operate in accordance with WiFi technology to provide communication with other nodes. Additionally or alternatively, the primary-RAT transceiver 211 and the secondary-RAT transceiver 212 may provide functionalities for LTE-Direct or WiFi-Direct D2D communications, respectively.

Figure 3:
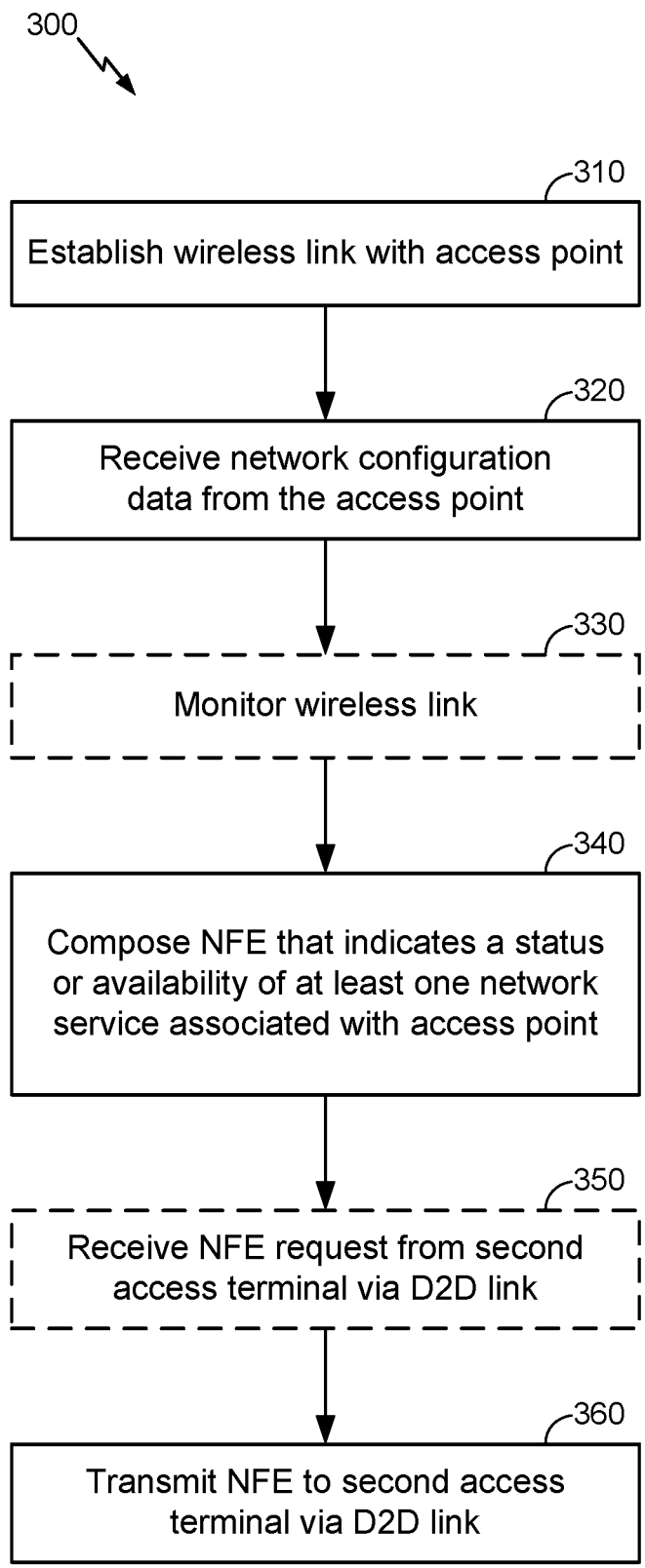
FIG. 3 generally illustrates a flow diagram for sharing network feedback information in accordance with an aspect of the disclosure.

FIG. 3 generally illustrates a method 300 for sharing network feedback information in accordance with an aspect of the disclosure. The method 300 may be performed by an access terminal, for example, the access terminal 150 of FIG. 1, the access terminal 160 of FIG. 1, the access terminal 200 of FIG. 2, or any other device in the present disclosure. However, for the purposes of illustration, the method 300 will be described below as it would be performed by the access terminal 160 of FIG. 1.

At 310, the access terminal 160 establishes a wireless link with an access point. The access point may be analogous to, for example, the access point 110 of FIG. 1, the access point 120 of FIG. 1, the access point 130 of FIG. 1, or any other device in the present disclosure. However, for the purposes of illustration, the method 300 will be described below as if the access terminal 160 had established the wireless link 162 with the access point 120 (as depicted in FIG. 1).

In some implementations, the access terminal 160 may establish the wireless link 162 with the access point 120 using a transceiver analogous to the primary-RAT transceiver 211 of FIG. 2, which may be configured to operate in accordance with LTE. However, the establishing at 310 may be performed by any suitable transceiver included in the access terminal 160, for example, a primary-RAT transceiver (such as the primary-RAT transceiver 211 depicted in FIG. 2) or a secondary-RAT transceiver such as the secondary-RAT transceiver 212 depicted in FIG. 2). The transceiver that performs the establishing at 310 may also work in tandem with at least one processor (analogous to, for example, the processing system 230 of FIG. 2) and/or at least one memory (analogous to, for example, the memory component 240 of FIG. 2).

At 320, the access terminal 160 receives network configuration data from the access point 120. The network configuration data may be gathered from synchronization signals (for example, a Primary Synchronization Signal (PSS), a Secondary Synchronization Signal (SSS), etc.)), information blocks (for example, a Master Information Block (MIB) or one or more System Information Blocks (SIBx), etc.)), or any other signal that carries data associated with a network configuration of the access point 120 (acknowledgements, control signals, beacons, registration signals, paging messages, etc.). The network configuration data may include indicators as to what network services (voice, data, SMS, etc.) are provided by the access point 120.

The receiving at 320 may be performed by any suitable transceiver included in the access terminal 160, for example, a primary-RAT transceiver (such as the primary-RAT transceiver 211 depicted in FIG. 2) or a secondary-RAT transceiver (such as the secondary-RAT transceiver 212 depicted in FIG. 2). The transceiver that performs the receiving at 320 may also work in tandem with at least one processor (analogous to, for example, the processing system 230 of FIG. 2) and/or at least one memory (analogous to, for example, the memory component 240 of FIG. 2).

At 330, the access terminal 160 optionally monitors the wireless link 162 that was established at 310. The monitoring of the wireless link 162 may include the monitoring of one or more characteristics of the wireless link 162, for example, frequency, timing, quality, availability, etc. The one or more characteristics of the wireless link 162 may be measured and/or recorded using any suitable technique, and may be discarded after a certain period of time or maintained indefinitely.

The monitoring at 330 may be performed by any suitable transceiver included in the access terminal 160, for example, a primary-RAT transceiver (such as the primary-RAT transceiver 211 depicted in FIG. 2) or a secondary-RAT transceiver (such as the secondary-RAT transceiver 212 depicted in FIG. 2). The transceiver that performs the monitoring at 330 may also work in tandem with at least one processor (analogous to, for example, the processing system 230 of FIG. 2) and/or at least one memory (analogous to, for example, the memory component 240 of FIG. 2). The one or more characteristics of the wireless link 162 may be recorded in at least one memory (analogous to, for example, the memory component 240 of FIG. 2).

At 340, the access terminal 160 composes a network feedback expression (NFE) that indicates a status or availability of at least one network service associated with the access point 120. The composing at 340 may be based on the network configuration data received at 320 from the access point 120. Additionally or alternatively, the composing at 340 may be based on the monitoring at 330 of the wireless link 162. For example, the access terminal 160 may evaluate the network configuration data received at 320, select information relating to the status or availability of one or more specific network services, and include that information in the NFE. Additionally or alternatively, the access terminal 160 may generate information relating to the status or availability of one or more specific network services based on the monitoring at 330 of the wireless link 162, and include that information in the NFE.

The NFE may be organized such that information relating to the status or availability of a specific network service is used to populate a specific data field in the NFE. For example, the NFE may include a sequence of characters, and a specific data field may be located at a predefined position within the sequence of characters.

The composing at 340 may be performed by at least one processor (analogous to, for example, the processing system 230 of FIG. 2) and/or at least one memory (analogous to, for example, the memory component 240 of FIG. 2).

At 350, the access terminal 160 optionally receives an NFE request from a second access terminal via a D2D link. The second access terminal may be analogous to, for example, the access terminal 150 of FIG. 1, the access terminal 200 of FIG. 2, or any other device in the present disclosure. However, for the purposes of illustration, the method 300 will be described below as if the access terminal 160 had received the NFE request from the access terminal 150 on the D2D link 156.

The receiving at 350 may be performed by any suitable transceiver included in the access terminal 160, for example, a primary-RAT transceiver (such as the primary-RAT transceiver 211 depicted in FIG. 2) or a secondary-RAT transceiver (such as the secondary-RAT transceiver 212 depicted in FIG. 2). The transceiver that performs the receiving at 350 may also work in tandem with at least one processor (analogous to, for example, the processing system 230 of FIG. 2) and/or at least one memory (analogous to, for example, the memory component 240 of FIG. 2).

As noted above, in some implementations the access terminal 160 may establish the wireless link 162 with the access point 120 using a transceiver analogous to the primary-RAT transceiver 211 of FIG. 2, which may be configured to operate in accordance with LTE. The access terminal 160 may also establish the D2D link 156 with the access terminal 150 using the primary-RAT transceiver 211 of FIG. 2. The resulting D2D link 156 may be, for example, an LTE-Direct wireless link.

Additionally or alternatively, the access terminal 160 may establish the D2D link 156 with the access terminal 150 using the secondary-RAT transceiver 212 of FIG. 2, which may be configured to operate in accordance with, for example, WiFi or Bluetooth. The resulting D2D link 156 may be, for example, a WiFi-Direct wireless link or a Bluetooth Low Energy wireless link.

At 360, the access terminal 160 transmits the NFE to the access terminal 150 via the D2D link 156. The transmitting at 360 may be intermittent (for example, periodic) and the commencement of intermittent transmitting of the NFE may be responsive to the establishment of the D2D link 156. Additionally or alternatively, the transmitting at 360 may be responsive to the receiving of an NFE request at 350. In either case, the transmitting at 360 may comprise one or more of a broadcast to every member of a D2D group or a targeted transmission to one or more specific members of a D2D group.

As will be understood from the foregoing, the optional receiving at 350 and the transmitting at 360 may be preceded by the establishing of the D2D link 156 between the access terminal 160 and the access terminal 150. The establishing of the D2D link 156 may be performed in accordance with any suitable protocol (for example, LTE-Direct, WiFi-Direct, Bluetooth, Bluetooth Low Energy, etc.). For example, to establish an LTE-Direct Wireless link, the access terminal 150 and the access terminal 160 may separately perform service authorization signaling with the network (for example, with the access points 110, 120, and/or 130); discover one another through the announcing, requesting, and/or monitoring of D2D availability; and establish the D2D link 156 after performing a match report. As noted above, example protocols for establishing a D2D link and transmitting/receiving thereon can be found in the Third-Generation Partnership Project's technical specifications 23.303, the WiFi Alliance Peer-to-Peer Services (P2Ps) Technical Specification, etc.

Although the method 300 is depicted as being performed in a particular sequence, it will be understood that this is solely for illustrative purposes, and the method 300 may be performed in any logical sequence.

Figure 4:
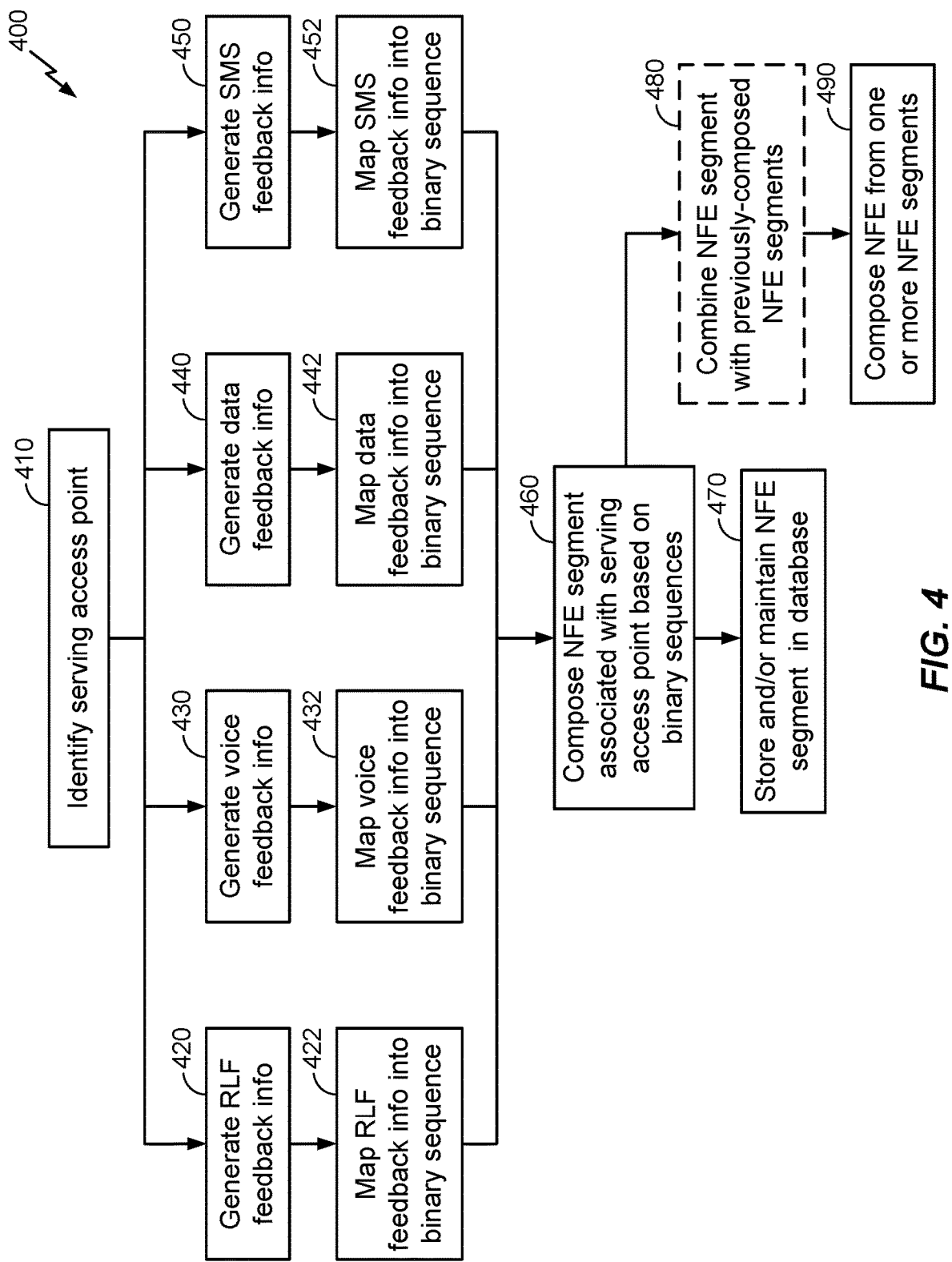
FIG. 4 generally illustrates a flow diagram for composing a network feedback expression (NFE) in accordance with an aspect of the disclosure.

FIG. 4 generally illustrates a method 400 for composing a network feedback expression (NFE) in accordance with an aspect of the disclosure. In some implementations, the method 400 may be used to perform the composing at 330 (depicted in FIG. 3). The method 400 may be performed by an access terminal, for example, the access terminal 150 of FIG. 1, the access terminal 160 of FIG. 1, the access terminal 200 of FIG. 2, or any other device in the present disclosure. However, for the purposes of illustration, the method 400 will be described below as it would be performed by the access terminal 160. The method 400 may be performed in response to successful establishment of the wireless link 162 with the access point 120 (as at 310 of FIG. 3) and/or receipt of network configuration data (as at 320 of FIG. 3). Additionally or alternatively, the method 400 may be performed intermittently (for example, periodically), or upon receipt of a NFE request (as at 350 of FIG. 3).

At 410, the access terminal 160 generates access point identifier information associated with a serving access point. The serving access point may be analogous to, for example, the access point 110 of FIG. 1, the access point 120 of FIG. 1, the access point 130 of FIG. 1, or any other device in the present disclosure. However, for the purposes of illustration, the method 400 will be described below as if the access point 120 were the serving access point for the access terminal 160. Prior to identifying the access point 120, the access terminal 160 may establish a wireless link with the access point 120 (for example, as depicted at 310 in FIG. 3) and/or receive network configuration data from the access point 120 (for example, as depicted at 320 in FIG. 3).

In some implementations, the access terminal 160 identifies the access point 120 based on the network configuration data. For example, the network configuration data may include an access point identifier. The access point identifier may be specific to the access point 120 and may serve to differentiate the access point 120 from other access points (for example, the access point 110 and the access point 130). The access point identifier may include, for example, a Public Land Mobile Network (PLMN) code, physical cell identifier (PCI), and/or an Evolved Universal Terrestrial Access Network Absolute Radio Frequency Channel Number (EARFCN).

At 420, the access terminal 160 generates radio link failure (RLF) feedback information. In some implementations, the access point 120 will intermittently (for example, periodically) indicate whether a cell associated with the access point 120 is barred or not barred. The indication as to whether the cell is barred may be included, for example, in the network configuration data received at 320 (for example, in a SIB2 block). If the access point 120 indicates that the cell is barred, then the access terminal 160 may not camp on the access point 120, and if the cell is not barred, then the access terminal 160 may camp on the access point 120. In accordance with an aspect of the disclosure, the access terminal 160 may generate RLF feedback information that indicates whether the cell associated with the access point 120 is barred or not barred. As will be discussed in greater detail below, the RLF feedback information may be used to compose an NFE.

At 420, the access terminal 160 may also monitor whether the cell is barred or not barred over time. The monitoring may be performed, for example, by recording over time the indications from the access point 120 as to whether the cell is barred or not barred. In some implementations, the RLF feedback information may include information as to whether the cell associated with the access point 120 is barred, and may further include information as to whether the cell has been barred for a time period that exceeds a cell bar threshold.

At 422, the access terminal 160 maps the RLF feedback information generated at 420 into one or more binary sequences. For example, a RLF feedback binary sequence may have a length of two bits, wherein '00' indicates that the cell is not barred, '01' indicates that the cell is barred for a period of time that does not exceed the cell bar threshold, '10' indicates that the cell has been barred for a period of time that exceeds the cell bar threshold, and '11' indicates that the RLF status of the access point 120 is unknown. However, it will be understood that this is an example provided solely for illustrative purposes, and that the one or more binary sequences mapped at 422 may be of any length and the information therein may be indicated using any specific sequence.

At 430, the access terminal 160 generates voice feedback information. In some implementations, the access point 120 will intermittently (for example, periodically) indicate whether the access point 120 supports voice service. The indication as to whether the access point 120 supports voice service may be included, for example, in the network configuration data received at 320. The voice feedback information generated by the access terminal 160 at 430 may therefore include voice service support information. For example, the access point 120 may indicate whether the access point 120 supports voice service in an attach accept message for Voice over IP (VOIP) and/or Single Radio Voice Call Continuity (SRVCC) received by the access terminal 160. In some implementations, a Mobility Management Entity (MME) may send an Initial Context Setup Request message (as specified in, for example, 3GPP TS 23.216) that includes a SRVCC Operation Possible Information Element (IE), thereby indicating that the ability access point 120 has the ability to perform SRVCC. In some implementations, 1× Circuit-Switch Fallback (1×CSFB) capability may be determined by the access terminal 160 based on SIB8 parameters and successful 1×CSFB registration.

Additionally or alternatively, the access point 120 may indicate the voice service type that is supported. Examples of a voice service type include Voice over IP (VOIP), 1× Circuit-Switch Fallback (1×CSFB), enhanced 1×CSFB (e1× CSFB), and Third Generation Partnership Project Circuit-Switch Fallback (3GPP CSFB), although it will be understood that other voice service types may be indicated. In some implementations, the access terminal 160 may determine whether VOIP is supported based on an indication that a successful registration for Internet Protocol Multimedia Subsystem (IMS) has been performed. The indication as to the type of voice service supported by the access point 120 may be included, for example, in the network configuration data received at 320 (as noted above). The voice feedback information generated by the access terminal 160 at 430 may therefore include voice service type information.

Additionally or alternatively, the access point 120 may indicate whether the access point 120 supports Single Radio Voice Call Continuity (SRVCC). The indication as to whether the access point 120 supports SRVCC may be included, for example, in the network configuration data received at 320 (as noted above). The voice feedback information generated by the access terminal 160 at 430 may therefore include SRVCC support information.

Additionally or alternatively, the access terminal 160 may also monitor call failures to generate voice service quality information. The monitoring may be performed, for example, by recording over time a number of call failures experienced by the access terminal 160 when using the voice service supported by the access point 120. The access terminal 160 may generate voice service quality information based on whether the number of call failures experienced over a certain duration of time exceeds a call failure threshold. The voice feedback information generated by the access terminal 160 at 430 may therefore include voice service quality information.

At 432, the access terminal 160 maps the voice service feedback information generated at 430 into one or more binary sequences. For example, a voice service support sequence may have a length of two bits, wherein '00' indicates that the access point 120 supports voice service, '01' indicates that the access point 120 does not support voice service, and '11' indicates that the voice service support status of the access point 120 is unknown.

Additionally or alternatively, a voice service type sequence may have a length of two bits, wherein '00' indicates that the access point 120 supports VOIP voice service, '01' indicates that the access point 120 supports 1× Circuit Switch Fallback (1×CSFB) voice service, '10' indicates that the access point 120 supports 3GPP Gateway (GW) voice service, and '11' indicates that the voice service type of the access point 120 is unknown.

Additionally or alternatively, a SRVCC support sequence may have a length of two bits, wherein '00' indicates that the access point 120 supports SRVCC, '01' indicates that the access point 120 does not support SRVCC, and '11' indicates that the SRVCC support status of the access point 120 is unknown.

Additionally or alternatively, a voice service quality sequence may have a length of two bits, wherein '00' indicates that the voice service quality is good (for example, the number of call failures does not exceed the call failure threshold), '01' indicates that the voice service quality is bad (for example, the number of call failures exceeds the call failure threshold), and '11' indicates that the voice service quality of the access point 120 is unknown.

It will be understood that the particular sequences provided above are examples provided solely for illustrative purposes, and that the one or more binary sequences mapped at 432 may be of any length and the information therein may be indicated using any specific sequence.

At 440, the access terminal 160 generates data feedback information. In some implementations, the access point 120 will intermittently (for example, periodically) indicate whether the access point 120 supports data service. The indication as to whether the access point 120 supports data service may be included, for example, in the network configuration data received at 320 or determined by the access terminal 160 based on whether the access terminal 160 is able to connect to the access point 120 and obtain data service. The data feedback information generated by the access terminal 160 at 440 may therefore include data service status information.

Additionally or alternatively, the access terminal 160 may monitor data service to generate data service quality information. The monitoring may be performed, for example, by recording over time a channel quality indicator (CQI) and/or a physical layer throughput experienced by the access terminal 160 on the wireless link 162. The access terminal 160 may generate data service quality information based on whether the average CQI over a certain duration of time exceeds a CQI sufficiency threshold. Additionally or alternatively, the access terminal 160 may generate data service quality information based on whether the actual physical layer throughput matches the expected physical layer throughput over a duration of time. The expected physical layer throughput may be based on, for example, the average CQI. The data feedback information generated by the access terminal 160 at 440 may therefore include data service quality information.

At 442, the access terminal 160 maps the data service status information generated at 440 into one or more binary sequences. For example, a data service status binary sequence may have a length of two bits, wherein '00' indicates that data service is supported, '01' indicates that data service is not supported, '10' indicates that data service is connected, and '11' indicates that data service is idle.

Additionally or alternatively, the access terminal 160 maps the data service quality information generated at 440 into one or more binary sequences. For example, a data service quality binary sequence may have a length of two bits, wherein '00' indicates that the data service quality is good (for example, the average CQI over a certain duration of time exceeds a CQI sufficiency threshold), '01' indicates that the voice service quality is bad (for example, the average CQI over a certain duration of time does not exceed a CQI sufficiency threshold), and '11' indicates that the voice service quality of the access point 120 is unknown. As another example, a data service quality binary sequence may have a length of two bits, wherein '00' indicates that the data service quality is good (for example, the average CQI over a certain duration of time exceeds the CQI sufficiency threshold), '01' indicates that the voice service quality is bad (for example, the average CQI does not meet the CQI sufficiency threshold), and '11' indicates that the voice service quality of the access point 120 is unknown.

It will be understood that the particular sequences provided above are examples provided solely for illustrative purposes, and that the one or more binary sequences mapped at 442 may be of any length and the information therein may be indicated using any specific sequence.

At 450, the access terminal 160 generates SMS feedback information. In some implementations, the access point 120 will intermittently (for example, periodically) indicate whether the access point 120 supports SMS service. The indication as to whether the access point 120 supports SMS service may be included, for example, in the network configuration data received at 320. For example, the access point 120 may indicate whether the access point 120 supports SMS service in an attach accept message received by the access terminal 160. The SMS feedback information generated by the access terminal 160 at 450 may therefore include SMS service support information.

Additionally or alternatively, the access point 120 may indicate the SMS service type that is supported. Examples of a SMS service type include Internet Protocol Multimedia Subsystem (IMS), SMS over S102, and SMS Gateway (GW), although it will be understood that other SMS service types may be indicated. The indication as to the type of SMS service supported by the access point 120 may be included, for example, in the network configuration data received at 320. For example, the access point 120 may indicate the SMS service type that is supported in an attach accept message received by the access terminal 160. The SMS feedback information generated by the access terminal 160 at 430 may therefore include SMS service type information.

At 452, the access terminal 160 maps the SMS service support information generated at 450 into one or more binary sequences. For example, a SMS service status binary sequence may have a length of two bits, wherein '00' indicates that SMS service is supported, '01' indicates that SMS service is not supported, and '11' indicates that it is unknown whether the access point 120 supports SMS service.

Additionally or alternatively, the access terminal 160 maps the SMS service type information generated at 450 into one or more binary sequences. For example, a SMS service type binary sequence may have a length of two bits, wherein '00' indicates an IMS service type, '01' indicates an S102 service type, '10' indicates an SMS GW service type, and '11' indicates that the SMS service type of the access point 120 is unknown.

It will be understood that the particular sequences provided above are examples provided solely for illustrative purposes, and that the one or more binary sequences mapped at 452 may be of any length and the information therein may be indicated using any specific sequence.

Figure 5:
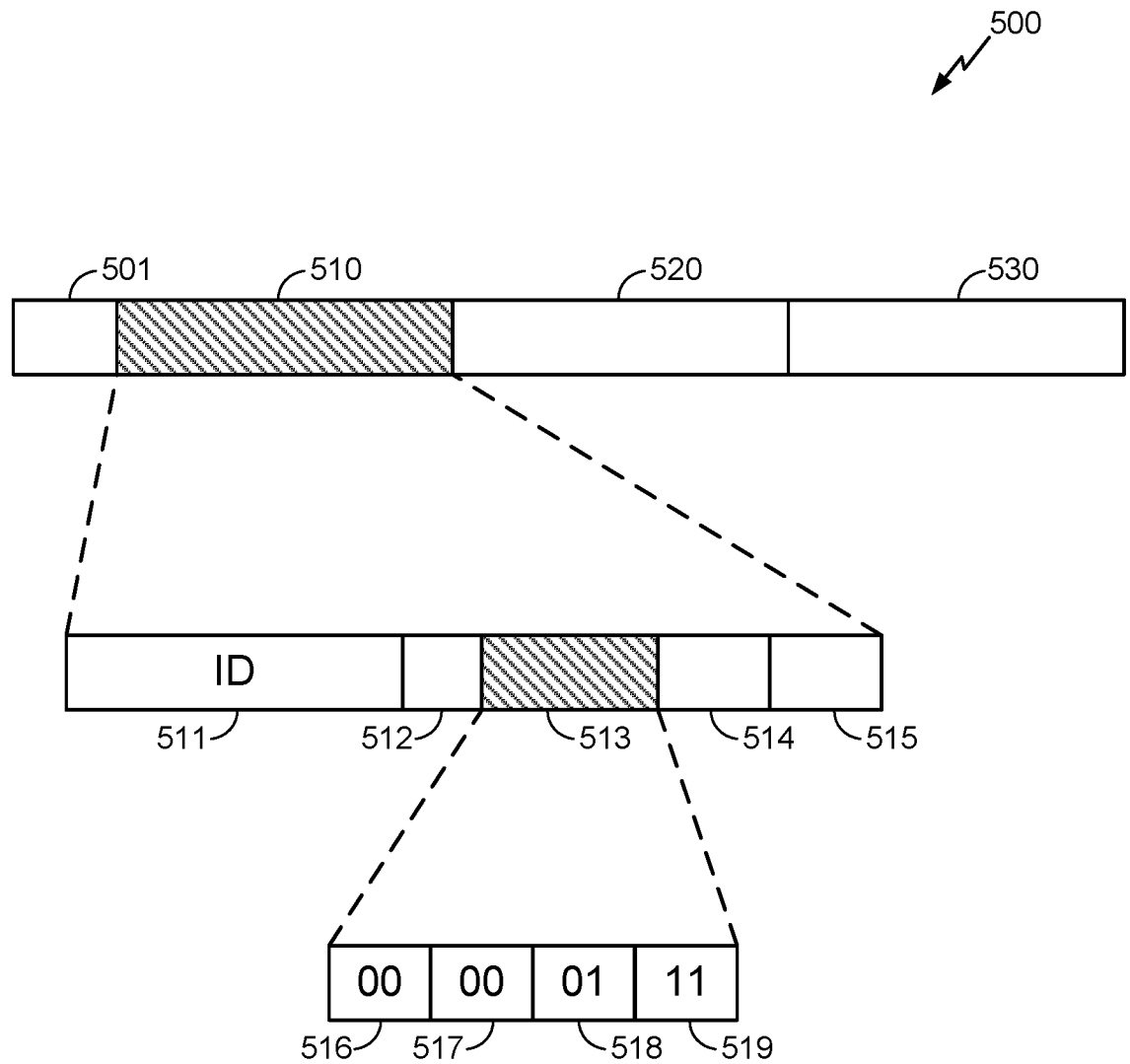
FIG. 5 generally illustrates an example of a predetermined arrangement that may be used to compose an NFE.

At 460, the access terminal 160 composes a NFL segment associated with the access point 120 based on the one or more binary sequences that are mapped at 422, 432, 442, 452, or any combination thereof. In some implementations, the one or more binary sequences that are mapped at 422, 432, 442, and 452 are arranged within a larger binary sequence in accordance with a predetermined arrangement. For example, the predetermined arrangement may specify that a predetermined number of bits at the beginning of the NFE segment constitute an access point identifier field that is to be populated with the access point identifier obtained at 410. The predetermined arrangement may further specify that the access point identifier field is followed by another predetermined number of bits which constitute a RLF feedback field, another predetermined number of bits which constitute a voice feedback field, yet another predetermined number of bits which constitute a data feedback field, and yet another predetermined number of bits which constitute a SMS feedback field. These fields may be populated with the one or more binary sequences that are mapped at 422, 432, 442, and 452 described above. FIG. 5, which will be described in greater detail below, generally illustrates an example of a predetermined arrangement that may be used to compose the NFE segment at 460.

At 470, the access terminal 160 stores and/or maintains the NFE segment in a NFE database. In some implementations, the NFE segment is timestamped and may be discarded after a certain duration of time.

The storing and/or maintaining at 470 may be performed by at least one processor (analogous to, for example, the processing system 230 of FIG. 2) and/or at least one memory (analogous to, for example, the memory component 240 of FIG. 2).

At 480, the access terminal 160 optionally combines the NFE segment with one or more previously-composed NFE segments, for example, previously-composed NFE segments that are retrieved from the NFE database described above. In some implementations, each NFE segment consists of a binary sequence and is combined with the one or more previously-composed NFE segments by arranging them from end to end. The NFE segments may be ordered based on age (for example, an amount of time stored and/or maintained in the NFE database), proximity (for example, a distance from the access terminal 160 or the access point 120), or size (for example, a bandwidth or throughput of the access point 120). As an example, the access terminal 160 may have previously camped on the access point 130. After composing (at 460) the NFE segment associated with the access point 120, the access terminal 160 may combine it with a previously-composed NFE segment associated with the access point 130.

At 490, the access terminal 160 composes a NFE from one or more NFE segments. The composing may include the providing of a header or expression code that identifies the binary sequence as a NFE. FIG. 5, which will be described in greater detail below, generally illustrates an example of a predetermined arrangement that may be used to compose the NFE at 490.

Although the method 400 as depicted in FIG. 4 includes the generation of RLF feedback information at 420, the generation of voice feedback information at 430, the generation of data feedback information at 440, and the generation of SMS feedback information at 450, it will be understood that each of the respective generations are optional, and that the method 400 may include the generating of more or fewer types of information.

FIG. 5 generally illustrates an example of a predetermined arrangement that may be used to compose an NFE 500. In this example, the NFE 500 includes a header 501 that identifies the NFE 500 as an NFE. The manner in which the header 501 identifies the NFE 500 as an NFE may depend on the D2D protocol over which the NFE 500 is to be transmitted.

The NFE 500 further includes an NFE segment 510 associated with a first access point (for example, access point 120 as depicted in FIG. 1), an NFE segment 520 associated with a second access point (for example, access point 130 as depicted in FIG. 1), and an NFE segment 530 associated with a third access point. Although three NFE segments 510, 520, 530 are shown in FIG. 5, it will be understood that this is solely for illustrative purposes, and that the NFE 500 may include any number of NFE segments.

Each of the NFE segments 510, 520, 530 may include a binary sequence in which each bit is mapped in accordance with a predetermined arrangement. In order to illustrate the predetermined arrangement, a detail of the NFE segment 510 is depicted in FIG. 5. However, it will be understood that each of the NFE segments 510, 520, 530 may be composed in accordance with the same predetermined arrangement.

As noted above, the predetermined arrangement may specify that a predetermined number of bits at the beginning of the NFE segment 510 may constitute an access point identifier field 511 that is to be populated with the access point identifier obtained at 410. The predetermined arrangement may further specify that the access point identifier field 511 is followed by another predetermined number of bits which constitute a RLF feedback field 512, another predetermined number of bits which constitute a voice feedback field 513, yet another predetermined number of bits which constitute a data feedback field 514, and yet another predetermined number of bits which constitute a SMS feedback field 515. These fields 512, 513, 514, 515 may be populated with the RLF feedback information generated at 420, the voice feedback information generated at 430, the data feedback information generated at 440, and the SMS feedback information generated at 450, respectively. In particular, each of the fields may be populated with one or more of the binary sequences that are mapped at 422, 432, 442, and 452, as described above.

In order to illustrate how the binary sequences are used to populate the respective fields 512, 513, 514, 515 in accordance with the predetermined arrangement, a detail of the voice feedback field 513 is depicted in FIG. 5. However, it will be understood that each of the fields 512, 513, 514, 515 may be composed in accordance with the same predetermined arrangement. For example, the predetermined arrangement may specify that within the voice feedback field 513, the first two bits may constitute a voice service support information field 516 (to return to an earlier example, '00' may indicate that voice service is supported on access point 120). The next two bits may constitute a voice service type information field 517 (to return to an earlier example, '00' may indicate that VOIP is the voice service type supported by access point 120). The next two bits may constitute a SRVCC support information field 518 (to return to an earlier example, '01' may indicate that the access point 120 does not support SRVCC). The next two bits may constitute a voice service quality field 519 (to return to an earlier example, '11' may indicate that the voice service quality of the access point 120 is unknown).

As noted above, FIG. 5 generally illustrates an example of a predetermined arrangement that may be used to compose the NFE 500. However, it will be understood that other predetermined arrangements may be used to compose the NFE 500. Some fields may be omitted while other fields may be added. The sequence of the NFE segments 510, 520, 530 may be changed, the sequence of the fields 511, 512, 513, 514, 515 may be changed, and/or the sequence of the fields 516, 517, 518, 519 may be changed.

Figure 6:
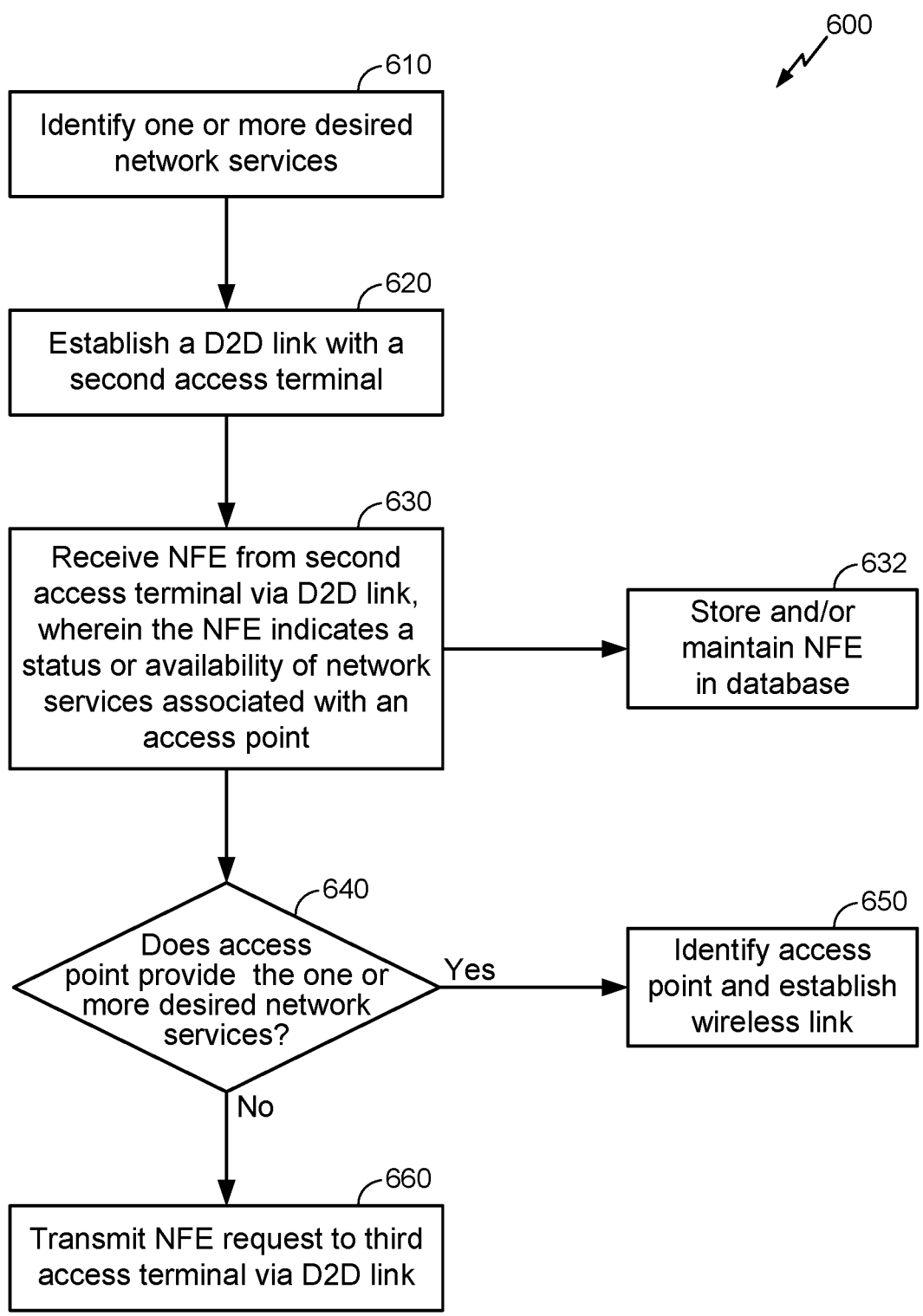
FIG. 6 generally illustrates a flow diagram for locating network services in accordance with an aspect of the disclosure.

FIG. 6 generally illustrates a method 600 for locating network services in accordance with an aspect of the disclosure. The method 600 may be performed by an access terminal, for example, the access terminal 150 of FIG. 1, the access terminal 160 of FIG. 1, the access terminal 200 of FIG. 2, or any other device in the present disclosure. However, for the purposes of illustration, the method 600 will be described below as it would be performed by the access terminal 150 of FIG. 1.

At 610, the access terminal 150 identifies one or more desired network services. In some implementations, the access terminal 150 may desire to camp on an access point that is not barred, an access point that provides a specific voice service type, an access point that provides a certain level of channel quality, etc. If there are more than one desired network services, the access terminal 150 may also prioritize the desired network services, as will be described in greater detail below.

The identifying and/or prioritizing at 610 may be performed by at least one processor (analogous to, for example, the processing system 230 of FIG. 2) and/or at least one memory (analogous to, for example, the memory component 240 of FIG. 2).

At 620, the access terminal 150 establishes a D2D link with a second access terminal. The second access terminal may be analogous to, for example, the access terminal 160 of FIG. 1, the access terminal 200 of FIG. 2, or any other device in the present disclosure. However, for the purposes of illustration, the method 600 will be described below as if the access terminal 150 had established the D2D link 156 with the access terminal 160. As noted above, the establishing of the D2D link 156 may be performed in accordance with any suitable protocol (for example, LTE-Direct, WiFi-Direct, Bluetooth, Bluetooth Low Energy, etc.).

In some implementations, the access terminal 150 may establish the D2D link 156 with the access terminal 160 using a transceiver analogous to the primary-RAT transceiver 211 of FIG. 2, which may be configured to operate in accordance with LTE. However, the establishing at 620 may be performed by any suitable transceiver included in the access terminal 160 (for example, a primary-RAT transceiver such as the primary-RAT transceiver 211 depicted in FIG. 2) or a secondary-RAT transceiver (such as the secondary-RAT transceiver 212 depicted in FIG. 2). The transceiver that performs the establishing at 620 may also work in tandem with at least one processor (analogous to, for example, the processing system 230 of FIG. 2) and/or at least one memory (analogous to, for example, the memory component 240 of FIG. 2).

At 630, the access terminal 150 receives a network feedback expression (NFE) from the access terminal 160 via the D2D link 156, wherein the NFE indicates a status or availability of network services associated with an access point. The access point may be analogous to, for example, the access point 110 of FIG. 1, the access point 120 of FIG. 1, the access point 130 of FIG. 1, or any other device in the present disclosure. However, for the purposes of illustration, the method 600 will be described below as if the access terminal 150 had received the NFE indicating a status or availability of network services associated with the access point 120. Also for the purposes of illustration, the method 600 will be described below as if the NFE was arranged similarly to the NFE 500 depicted in FIG. 5.

In some implementations, the access terminal 150 may receive the NFE 500 using a transceiver analogous to the primary-RAT transceiver 211 of FIG. 2, which may be configured to operate in accordance with LTE. However, the receiving at 630 may be performed by any suitable transceiver included in the access terminal 160 (for example, a primary-RAT transceiver such as the primary-RAT transceiver 211 depicted in FIG. 2) or a secondary-RAT transceiver (such as the secondary-RAT transceiver 212 depicted in FIG. 2). The transceiver that performs the receiving at 630 may also work in tandem with at least one processor (analogous to, for example, the processing system 230 of FIG. 2) and/or at least one memory (analogous to, for example, the memory component 240 of FIG. 2).

At 632, the access terminal 150 stores and/or maintains the NFE 500 in a NFE database. In some implementations, the NFE 500 is broken down into the NFE segments 510, 520, 530. As noted above, each NFE segment may be associated with a different access point. In some implementations, each NFE segment is timestamped and may be discarded after a certain duration of time.

The storing and/or maintaining at 470 may be performed by at least one processor (analogous to, for example, the processing system 230 of FIG. 2) and/or at least one memory (analogous to, for example, the memory component 240 of FIG. 2).

In the foregoing example, the access terminal 150 received the NFE 500 transmitted from the access terminal 160 (at 630) and stored and/or maintained the NFE segments 510, 520, 530 in the NFE database (at 632). Each of the NFE segments 510, 520, 530 potentially includes data indicating a status or availability of at least one network service associated with an access point. It will be understood that if the access terminal 150 determines to generate a NFE similar to the NFE 500 received from the access terminal 160 (for example, by performing a method similar to the method 300 depicted in FIG. 3), it may choose to include any of the NFE segments 510, 520, 530 stored and/or maintained in the NFE database. By including one or more of the NFE segments 510, 520, 530 received from access terminal 160 in a NFE and transmitting it to another access terminal (i.e., an access terminal other than access terminal 160), it acts as a relay for the NFE segments 510, 520, 530. It will be understood that by relaying NFE segments to other access terminals, a large amount of data indicating a status or availability of at least one network service associated with an access point can be rapidly disseminated. In a D2D group containing a plurality of members, it is only necessary for one member of the group to have generated an NFE segment associated with a particular access point. That NFE segment can be transmitted and/or relayed to each member of the D2D group, thereby conserving the resources which might otherwise be consumed in attempts to locate network services.

At 640, the access terminal 150 determines, based on the NFE 500 received at 630, whether the access point 120 provides the one or more desired network services identified at 610. The access terminal 150 may determine whether the one or more desired network services are provided based on one or more of the RLF feedback information provided in the RLF feedback field 512, the voice feedback information provided in the voice feedback field 513, the data feedback information provided in the data feedback field 514, and/or the SMS feedback information provided in the SMS feedback field 515. As noted above, this information may be provided by evaluating the sequence of characters provided in the NFE 500 received at 630. The information may be provided, for example, in the predetermined arrangement depicted in FIG. 5.

If the access terminal 150 determines that the access point 120 does provide the one or more desired network services ('yes' at 640 of FIG. 6), then the method 600 proceeds to 650 (described below). If the access terminal 150 determines that the access point 120 does not provide the one or more desired network services ('no' at 640 of FIG. 6), then the method 600 proceeds to 660 (described below).

The determining at 640 may be performed by at least one processor (analogous to, for example, the processing system 230 of FIG. 2) and/or at least one memory (analogous to, for example, the memory component 240 of FIG. 2).

At 650, having determined at 640 that the access point 120 provides the one or more desired network services, the access terminal 150 identifies the access point 120 and establishes a wireless link with the access point 120. The access point 120 may be identified based on an access point identifier provided in the access point identifier field 511.

In some implementations, the access terminal 150 may establish the wireless link with the access point 120 using a transceiver analogous to the primary-RAT transceiver 211 of FIG. 2, which may be configured to operate in accordance with LTE. However, the establishing at 650 may be performed by any suitable transceiver included in the access terminal 150, for example, a primary-RAT transceiver (such as the primary-RAT transceiver 211 depicted in FIG. 2) or a secondary-RAT transceiver such as the secondary-RAT transceiver 212 depicted in FIG. 2). The transceiver that performs the establishing at 650 may also work in tandem with at least one processor (analogous to, for example, the processing system 230 of FIG. 2) and/or at least one memory (analogous to, for example, the memory component 240 of FIG. 2).

As will be understood from the foregoing, the access terminal 150 may avoid establishing a wireless link with the access point 120 if it has determined (based on the NFE 500 received at 630) that the access point 120 does not provide the desired network services. Conventionally, an access terminal would need to camp on the access point 120 and directly receive network configuration data in order to make this determination. However, in accordance with the method 600, the access terminal 150 may utilize the NFE 500 (received at 630 via the D2D link 156) to make the determination as to whether the access point 120 provides the one or more desired network services. In the event that the access point 120 does not provide the one or more desired network services, the access terminal 150 can terminate a search for the one or more desired network services, or attempt to locate them elsewhere. In either case, the access terminal 150 obtains the information necessary to make the determination without camping on the access point 120, which requires significant consumption of resources (power, processing, bandwidth, etc.).

At 660, having determined at 640 that the access point 120 does not provide the one or more desired network services, the access terminal 150 may transmit an NFE request to third access terminal via a D2D link. As noted above, the access terminal 150 may choose to continue searching for the one or more desired network services. In some implementations, the one or more desired network services may be located by transmitting an NFE request. The NFE request may be broadcast to the members of a D2D group. Additionally or alternatively, the access terminal 150 may establish a D2D group for the purposes of transmitting the NFE request. Additionally or alternatively, the access terminal 150 may transmit the NFE request to one or more specific members of a D2D group, for example, members that have not already provided an NFE.

In some implementations, the NFE request may take the form of the NFE 500. For example, the access terminal 150 and the access terminal 160 may be preconfigured to interpret an NFE received from a D2D correspondent as an NFE request.

In some implementations, the access terminal 150 may transmit the NFE request using a transceiver analogous to the primary-RAT transceiver 211 of FIG. 2, which may be configured to operate in accordance with LTE. However, the transmitting at 660 may be performed by any suitable transceiver included in the access terminal 160 (for example, a primary-RAT transceiver such as the primary-RAT transceiver 211 depicted in FIG. 2) or a secondary-RAT transceiver (such as the secondary-RAT transceiver 212 depicted in FIG. 2). The transceiver that performs the transmitting at 660 may also work in tandem with at least one processor (analogous to, for example, the processing system 230 of FIG. 2) and/or at least one memory (analogous to, for example, the memory component 240 of FIG. 2).

The method 600 depicted in FIG. 6 depicts a scenario where a particular set of one or more desired network services is identified at 610, and the determination as to whether to establish a wireless link with the access point 120 is based on whether the access point 120 provides the particular set of one or more desired network services. However, as noted above, the access terminal 150 may also prioritize the desired network services. In some implementations, it may be a high priority that the access point not be barred, and the access terminal 150 may determine that it will not attempt to camp on an access point that is barred. In some implementations, it may be a low priority that the access point provide a certain level of channel quality, and the access terminal 150 may determine that an access point associated with the certain level of channel quality is preferred, but that the certain level of channel quality is not a prerequisite condition for camping on the access point. The priorities may be set in any suitable manner. For example, the access terminal 150 may be preconfigured to prioritize certain network services. Additionally or alternatively, the access terminal 150 may receive user indications (explicit or implicit) from a user of the access terminal 150 as to which network services are most desired.

In some implementations, the access terminal 150 may use an access point scoring system to evaluate a plurality of access points in terms of the status and/or availability of a plurality of prioritized network services. For example, if the access point 120 is not barred and the access point 130 is barred, then the access terminal 150 may give a higher component score to the access point 120. Moreover, if the access point 120 supports data service with low channel quality and the access point 130 supports data service with high channel quality, then the access terminal 150 may give a higher component score to the access point 130. Additionally or alternatively, the component scores may be weighted based on priority and summed to generate an overall score for a particular access point. For example, if RLF is a greater priority than data quality, then the weight for the RLF component score may be greater than the weight for the data quality component score.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences, and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. In the alternative, the processor and the storage medium may reside as discrete components in a user terminal.

In one or more exemplary embodiments, the functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps, and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of sharing network feedback information comprising:
   establishing, at a first access terminal, a wireless link with an access point, and a device-to-device (D2D) link with a second access terminal;

receiving, at the first access terminal, network configuration data from the access point;

receiving, at the first access terminal, a request for network feedback from the second access terminal over the established D2D link;

composing, at the first access terminal, based on the received network configuration data, a network feedback expression that indicates a status or availability of at least one network service associated with the access point; and transmitting, at the first access terminal, the network feedback expression to the second access terminal via the established D2D link in response to the receiving of the request for network feedback.

2. The method of claim 1, further comprising:

generating access point identifier information based on an access point identifier included in the network configuration data;

wherein the network feedback expression includes the access point identifier information.

3. The method of claim 2, wherein the access point identifier includes one or more of a Public Land Mobile Network (PLMN) code, a physical cell identifier (PCI), or an Evolved Universal Terrestrial Access Network Absolute Radio Frequency Channel Number (EARFCN).

4. The method of claim 1, further comprising:

generating radio link failure (RLF) information based on whether the network configuration data indicates that the access point is barred or not barred;

wherein the network feedback expression includes the RLF information.

5. The method of claim 4, further comprising:

monitoring the network configuration data over time; and determining if an amount of time over which the access point is barred exceeds a cell bar threshold;

wherein the RLF information further indicates that the access point is barred in the short term if the amount of time in which the access point is barred does not exceed the cell bar threshold.

6. The method of claim 1, further comprising:

generating voice feedback information based on one or more of:

whether the network configuration data indicates that the access point supports voice service;

a voice service type indicated by the network configuration data; and whether the network configuration data indicates that the access point supports Single Radio Voice Call Continuity (SRVCC);

wherein the network feedback expression includes the voice feedback information.

7. The method of claim 6, wherein the voice service type includes one or more of Voice over IP (VOIP), 1× Circuit-Switch Fallback (1×CSFB), enhanced 1×CSFB (e1×CSFB), and Third Generation Partnership Project Circuit-Switch Fallback (3GPP CSFB).

8. The method of claim 6, further comprising:

monitoring a number of call failures associated with a voice service of the access point over a period of time; and determining if the number of call failures exceeds a call failure threshold;

wherein the voice feedback information further includes voice service quality information based on whether the number of call failures exceeds the call failure threshold.

9. The method of claim 1, further comprising:

generating data feedback information based on whether the network configuration data indicates that the access point supports data service;

wherein the network feedback expression includes the data feedback information.

10. The method of claim 9, further comprising:

monitoring a channel quality indicator (CQI) and a physical layer throughput associated with the access point; and generating data service quality information based on one or more of a comparison of an average of the monitored CQI to a CQI sufficiency threshold and a comparison of an actual physical layer throughput to an expected physical layer throughput;

wherein the data feedback information further includes the data service quality information.

11. The method of claim 1, further comprising:

generating short message service (SMS) feedback information based on one or more of:

whether the network configuration data indicates that the access point supports SMS service; and a SMS service type indicated by the network configuration data;

wherein the network feedback expression includes the SMS feedback information.

12. The method of claim 11, wherein the SMS service type includes one or more of SMS over Internet Protocol Multimedia Subsystem (IMS), SMS or S102, and SMS Gateway (GW).

13. The method of claim 1, further comprising:

receiving a network feedback expression request from the second access terminal via the D2D link; and transmitting the network feedback expression to the second access terminal in response to the receiving of the network feedback expression request.

14. The method of claim 1, wherein the network feedback expression includes:

a first network feedback expression segment that indicates the status or availability of at least one network service associated with the access point; and a second network feedback expression segment that indicates a status or availability of at least one network service associated with a different access point.

15. The method of claim 1, wherein the second access terminal does not have an established wireless link to the access point.

16. A method of locating network services comprising:

identifying one or more desired network services;

establishing, at a first access terminal, a device-to-device (D2D) link with a second access terminal;

transmitting, at the first access terminal, a request for network feedback to the second access terminal over the established D2D link;

receiving, at the first access terminal, a network feedback expression from the second access terminal via the D2D link, wherein the network feedback expression indicates a status or availability of one or more network services associated with an access point; and determining, at the first access terminal, based on the network feedback expression received from the second access terminal, whether the access point provides the one or more desired network services.

17. The method of claim 16, further comprising:

in response to a determination that the access point provides the one or more desired network services, identifying the access point based on an access point identifier indicated by the received network feedback expression; and establishing a wireless link with the identified access point.

18. The method of claim 16, further comprising:
establishing, at the first access terminal, a D2D link with a third access terminal; and
in response to a determination that the access point does not provide the one or more desired network services, transmitting another network feedback expression request to the third access terminal.

19. The method of claim 16, wherein the status or availability of the one or more network services associated with the access point comprise:
a radio link failure (RLF) status of the access point;
a voice service support status of the access point;
a voice service quality status of the access point;
a voice service type of the access point;
a Single Radio Voice Call Continuity (SRVCC) support status of the access point;
a data quality status of the access point;
a short message service (SMS) availability status;
a SMS support type of the access point; or
any combination of the foregoing.

20. An apparatus for sharing network feedback information comprising:
at least one transceiver, at a first access terminal, configured to:
establish, at the first access terminal, a wireless link with an access point, and a device-to-device (D2D) link with a second access terminal;
receive network configuration data from the access point;
receive a request for network feedback from the second access terminal over the established D2D link; and
transmit a network feedback expression to the second access terminal via the established D2D link in response to the receiving of the request for network feedback;
at least one processor, at the first access terminal; and
at least one memory, at the first access terminal, coupled to the at least one processor, the at least one processor and the at least one memory being configured to:
compose the network feedback expression, at the first access terminal, based on the received network configuration data, wherein the network feedback expression indicates a status or availability of at least one network service associated with the access point.

21. The apparatus of claim 20, the at least one processor and the at least one memory being further configured to:
determine an identity of the access point based on an access point identifier included in the network configuration data;
wherein the network feedback expression indicates an access point identifier of the access point.

22. The apparatus of claim 20, the at least one processor and the at least one memory being further configured to:
determine a radio link failure (RLF) status of the access point based on whether a cell associated with the access point is barred or not barred;
wherein the network feedback expression indicates the RLF status of the access point.

23. The apparatus of claim 20, the at least one processor and the at least one memory being further configured to:

determine a voice service support status of the access point based on voice service support data included in the network configuration data;
wherein the network feedback expression indicates the voice service support status of the access point.

24. The apparatus of claim 20, the at least one transceiver being further configured to:
receive a request for the network feedback expression from the second access terminal via the D2D link; and
transmit the network feedback expression in response to the receiving of the network feedback expression request.

25. The apparatus of claim 20, wherein the access point is a serving access point, and the network feedback expression indicates:
the status or availability of at least one network service associated with the serving access point; and
a status or availability of at least one network service associated with a previous serving access point.

26. An apparatus for locating network services comprising:
at least one transceiver, at a first access terminal, configured to:
establish, at the first access terminal, a device-to-device (D2D) link with a second access terminal;
transmit a request for network feedback to the second access terminal over the established D2D link; and
receive, at the first access terminal, a network feedback expression from the second access terminal via the D2D link, wherein the network feedback expression indicates a status or availability of one or more network services associated with an access point; and
at least one processor, at the first access terminal; and
at least one memory, at the first access terminal, coupled to the at least one processor, the at least one processor and the at least one memory being configured to:
identify one or more desired network services; and
determine, at the first access terminal, based on the network feedback expression received from the second access terminal, whether the access point provides the one or more desired network services.

27. The apparatus of claim 26, wherein:
in response to a determination that the access point provides the one or more desired network services, the at least one processor and the at least one memory are further configured to identify the access point based on an access point identifier indicated by the received network feedback expression; and
the at least one transceiver is further configured to establish a wireless link with the identified access point.

28. The apparatus of claim 26, wherein the at least one transceiver is further configured to:
establish, at the first access terminal, a D2D link with a third access terminal; and
in response to a determination that the access point does not provide the one or more desired network services, transmit another network feedback expression request to the third access terminal.

29. The apparatus of claim 26, wherein the status or availability of the one or more network services associated with the access point comprise:
a radio link failure (RLF) status of the access point;
a voice service support status of the access point;
a voice service quality status of the access point;
a voice service type of the access point;

a Single Radio Voice Call Continuity (SRVCC) support status of the access point;
a data quality status of the access point;
a short message service (SMS) availability status;
a SMS support type of the access point; or
any combination of the foregoing.

30. A method of sharing network feedback information comprising:
    establishing, at a first access terminal, a wireless link with an access point;
    monitoring, at the first access terminal, a performance of the wireless link as experienced by the first access terminal;
    determining, at the first access terminal, and based on the monitoring, at least one performance characteristic associated with the established wireless link;
    composing, at the first access terminal, and based on the monitoring, a network feedback expression such that the network feedback expression indicates the at least one performance characteristic; and
    transmitting, at the first access terminal, the network feedback expression to a second access terminal via a device-to-device (D2D) link.

31. The method of claim 30, wherein the monitoring of the performance of the wireless link comprises:
    monitoring over time an amount of time over which the access point is barred; and
    determining if the amount of time over which the access point is barred exceeds a cell bar threshold;
    wherein composing the network feedback expression comprises:
    populating an RLF feedback field in the network feedback expression such that the RLF feedback field indicates whether the amount of time over which the access point is barred exceeds the cell bar threshold.

32. The method of claim 30, wherein the monitoring of the performance of the wireless link comprises:
    monitoring, at the first access terminal, a number of call failures associated with a voice service of the access point; and
    determining if the number of call failures exceeds a call failure threshold;
    wherein composing the network feedback expression comprises:
    populating a voice feedback field in the network feedback expression such that the voice feedback field indicates whether the number of call failures exceeds the call failure threshold.

33. The method of claim 30, wherein the monitoring of the performance of the wireless link comprises:
    monitoring, at the first access terminal, at least one of a channel quality indicator (CQI) or a physical layer throughput associated with the access point; and
    determining at least one of if an average of the monitored CQI exceeds a CQI sufficiency threshold or if an expected physical layer throughput exceeds an actual physical layer throughput;
    wherein composing the network feedback expression comprises:
    populating a data feedback field in the network feedback expression such that the data feedback field indicates at least one of whether the monitored CQI exceeds the CQI sufficiency threshold or whether the expected physical layer throughput exceeds the actual physical layer throughput.

* * * * *